US011911344B2

(12) United States Patent
Runft et al.

(10) Patent No.: US 11,911,344 B2
(45) Date of Patent: Feb. 27, 2024

(54) DEVICE FOR DOSING A PRODUCT

(71) Applicant: Syntegon Technology GmbH, Waiblingen (DE)

(72) Inventors: Werner Runft, Winnenden (DE); Thomas Brinz, Bissingen an der Teck (DE); Bernhard Wagner, Schorndorf (DE)

(73) Assignee: Syntegon Technology GmbH, Waiblingen (DE)

( * ) Notice: Subject to any disclaimer, the term of this patent is extended or adjusted under 35 U.S.C. 154(b) by 881 days.

(21) Appl. No.: 16/965,069

(22) PCT Filed: Jan. 31, 2018

(86) PCT No.: PCT/EP2018/052350
§ 371 (c)(1),
(2) Date: Jul. 27, 2020

(87) PCT Pub. No.: WO2019/149345
PCT Pub. Date: Aug. 8, 2019

(65) Prior Publication Data
US 2021/0106500 A1 Apr. 15, 2021

(51) Int. Cl.
*A61J 3/07* (2006.01)

(52) U.S. Cl.
CPC ............ *A61J 3/074* (2013.01); *A61J 2200/70* (2013.01); *A61J 2200/74* (2013.01)

(58) Field of Classification Search
CPC ................ B65B 1/38; A61J 3/07; A61J 3/074
See application file for complete search history.

(56) References Cited

U.S. PATENT DOCUMENTS 4,864,876 A * 9/1989 Botzolakis .............. A61J 3/074 73/862.541
7,640,953 B2 * 1/2010 Ansaloni ................. A61J 3/074 141/147

FOREIGN PATENT DOCUMENTS

CN 1551753 A 12/2004
CN 104507442 A 4/2015
(Continued)

OTHER PUBLICATIONS

Chinese Patent Office First Office Action for Application No. 201880088218.3 dated Jan. 12, 2022 (17 pages including English translation).

(Continued)

*Primary Examiner* — Nahida Sultana
(74) *Attorney, Agent, or Firm* — Michael Best & Friedrich LLP

(57) ABSTRACT

A device for dosing a product in capsules (12) or similar, comprising at least one dosing disc (36) which has dosing openings (38), and at least two filling stations (41-45) with which groups of dosing opening (38) are associated, wherein each filling station (41-45) comprises at least one tamping pin (51-55); the tamping pin (51-55) can plunge to a specified depth (h1-h5) into the dosing opening (38) to compress the product (17), and said tamping pin has at least one pressing means (71) for producing a variable pressure (p1-p5) with which each tamping pin (51-55) elastically deflects into the dosing opening (38); and at least one adjusting means, in particular an adjusting drive (61-65), is provided in order to adjust the depth (h1 to h5) for each of the two tamping pins (51-55) independently of one another.

11 Claims, 3 Drawing Sheets

(56) References Cited

FOREIGN PATENT DOCUMENTS

| | | | |
|---|---|---|---|
| DE | 10001068 | C1 | 5/2001 |
| DE | 102011015823 | A1 | 11/2011 |
| KR | 100861026 | B1 | 9/2008 |
| WO | 2000/032474 | A1 | 6/2000 |

OTHER PUBLICATIONS

English translation of International Search Report for Application No. PCT/EP2018/052350 dated Sep. 21, 2018 (2 pages).
Written Opinion for Application No. PCT/EP2018/052350 dated Sep. 21, 2018 (5 pages).

* cited by examiner

DEVICE FOR DOSING A PRODUCT

BACKGROUND

The present invention relates to a device for dosing a product.

A device for dosing and dispensing powder into hard gelatin capsules or the like is already known from DE 10001068 C1. This device comprises a phased rotation dosing disc, in the base of which bores are formed which interact with tamping pins that can be moved up and down. The tamping pins are arranged on a common tamping pin carrier and press the powder into pellets when plunged in bores. In order to detect breakage of springs and to be able to make a determination about the mass of the compacts, means are provided which detect the spring travel of the tamping pins immediately upstream of the ejector pins.

SUMMARY

It is an object of the present invention to further improve the prior art, in particular to achieve a faster and easier setting of the device with high dosing accuracy.

By contrast, the device according to the invention has the advantage that essential process parameters may be changed in a targeted manner, which parameters have a significant effect on the accuracy of the desired weight to be dosed. This is achieved by provision of both by pressing means for producing a different pressure for a tamping pin with which the tamping pin deflects into the dosing opening, and adjusting means for adjusting the depth to which the tamping pins plunge into dosing openings. It has been found that, in particular, the two process parameters pressure and depth in this combination have significant effects on the accuracy of the filled weight. The targeted variability of the device according to the invention enables it to automatically set different process parameter combinations and to determine the effects on the dosed weight in order to increase the accuracy of the dosing. In this way, the capsule weight (for example the mean value of the weight) and the filling accuracy/deviations (for example in the form of the standard deviation), which depend on the process parameters, can be set in a targeted manner.

In an expedient further development, at least one sensor for detecting at least one product bed depth of the product arranged on the dosing disc and/or at least one product feed for supplying the product to the dosing disc in order to achieve a specific product bed depth are provided. The process parameter of the product bed depth also has a significant effect on the quality of the weight, so that the provision of the sensor and/or the product feed further improves or accelerates the dosing quality of the device and an automatic adjustment. This parameter too may be used to optimize the setting of the process parameters.

In an expedient further development, a control device specifies different process parameters, in particular different depths and/or different pressures and/or different product bed depths and/or different rotational speeds of a drive of the dosing disc. The control device particularly advantageously detects the respective weight of the product dosed into the capsule for different settings of the process parameters. The effects of the relevant process parameters on the desired weight can be determined in the form of a plurality of measured values. A suitable weighing device is particularly expediently provided, so that the data acquisition process can run automatically.

In an expedient further development, the control device is designed to create a model, dependent on the different settings of the process parameters and the respective weight of the product dosed into the capsule, in which the relationship between at least one process parameter and the weight and/or the standard deviation of the weight is shown. This model will later be used to achieve an optimal setting of the essential process parameters dependent on a target weight (or further specifications such as the permissible deviation of the weight, operating rate of the device, etc.) specified by the user. This adjustment process can now take place automatically, so that the user can do without lengthy manual adjustments and time-consuming tests.

In an expedient further development, at least one sensor is provided for detecting at least one process parameter. This ensures an accurate detection of the essential process parameters, so that the accuracy with regard to the creation of the model and ultimately with regard to the quality of the dosing can be further improved.

In an expedient further development, at least one pressure control element and/or at least one pressure chamber and/or at least one piston is provided as the pressing means. In this embodiment in particular, the variability of the device may be increased further by means of a pneumatic spring since the pressure may be individually adjusted particularly easily.

In an expedient further development, it is provided that the control device controls at least the product feed in order to achieve a constant product bed depth. As a result, uniform filling of the dosing chambers can be achieved, which has a positive effect on the accuracy of the product to be dosed.

In an expedient further development, at least one force sensor arranged on the transfer pin is provided. Through targeted monitoring of the force required during the transfer, critical operating situations during dosing, such as those resulting from deposits, buildups, product residues or the like, can be promptly recognized in order to initiate countermeasures at an early stage.

Additional expedient further developments result from further dependent claims and from the description.

BRIEF DESCRIPTION OF THE DRAWINGS

Exemplary embodiments of the device according to the invention are shown in the drawing and are described in more detail below.

In the drawings.

DETAILED DESCRIPTION

Figure 1:
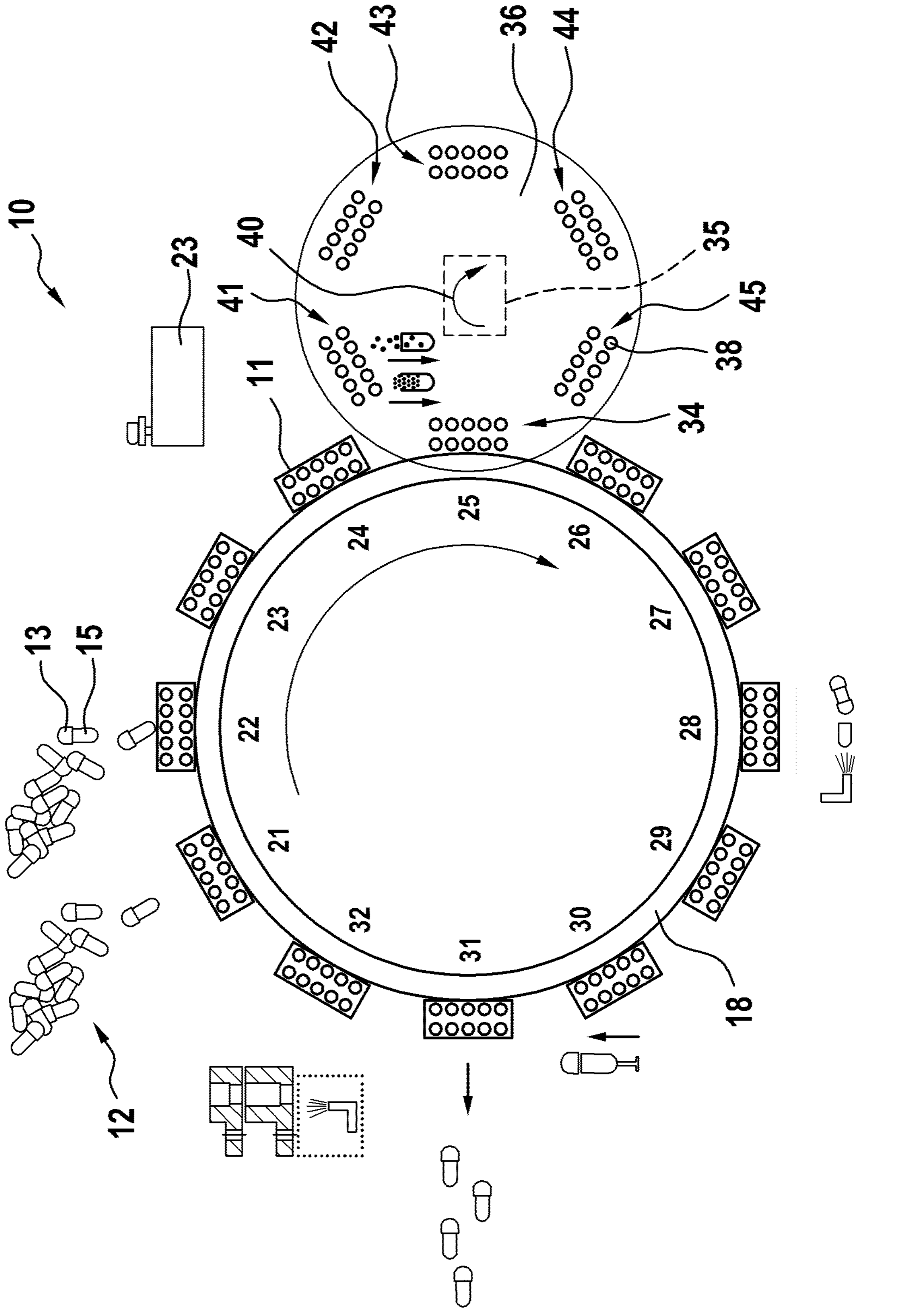
FIG. 1 is a station overview of a device for dosing a capsule.

The exemplary embodiment according to FIG. 1 shows an overview of various stations of a device 10 for filling and closing capsules 12, preferably hard capsules, in particular hard gelatin capsules. A capsule holder 11 comprises different receptacles for capsules 12 in order to feed them to different work stations 21-32. The capsules 12, consisting of an upper capsule part 13 and a lower capsule part 15, are fed to the respective capsule holder 11 in at least one sorting station 21, 22, preferably two sorting stations. A station 23 for capsule upper part scanning checks whether the full number of capsules 12 supplied to capsule holder 11 is present. This station 23 may also be provided only as an option. The capsules 12 tested in this way arrive at an optionally provided filling station 24 by a rotation of a segment wheel 18 moving the capsule holders 11. In a subsequent filling station 25, filling materials are fed to the capsules 12. These are usually drugs in powder form that are placed in the capsules 12. However, pellets or the like may also be inserted into the capsules 12 as filling material or product Zen to be dosed. In connection with, for example, a dosing disc 36 for inserting powder or pellets, the lower capsule parts 15 are filled with the desired filling quantity of filling material. Different filling principles may be used here. This is optionally followed by a further filling station 26. This is followed by a faulty capsule station 27. In this station 27, non-separated or incorrectly inserted capsules 12 or ones having a so-called double hat are ejected. Defective capsules 12 are thus expelled. This is optionally followed by a further filling station 28, for example for pellets or tablets. This is then followed by a closing station 29 in which the filled lower capsule parts 15 are closed with associated upper capsule parts 13. The next station is a capsule ejection 30. There, the filled and sealed capsules 12 are discharged from capsule holder 11 and fed to further processing steps. Defective capsules 16 can be removed via this ejection station. The next station also serves for capsule ejection 31 in order to increase the output quantity. In the ejection stations 30, 31, the capsules 12 may be ejected individually or remain in capsule holder 11. A cleaning station 32 is used to clean the capsules 12 in capsule holder 11, which are now empty or are still recognized as bad. The segment wheel 18 has now undergone a complete revolution, so that the capsule holder 11 is again available for the sorting station 21 or 22.

Filling station 25 comprises, for example, a dosing disc 36, which is driven at a specific rotational speed 40 by a schematically indicated drive 35. In dosing disc 36, a plurality of groups of dosing openings 38 are provided with associated filling stations 41-45. For example, five filling stations 41-45 and a transfer position 34 are implemented for transferring the product 17 dosed into the dosing openings 38 into the lower parts 15 of the capsules 12 that are provided by capsule holder 11.

Figure 2:
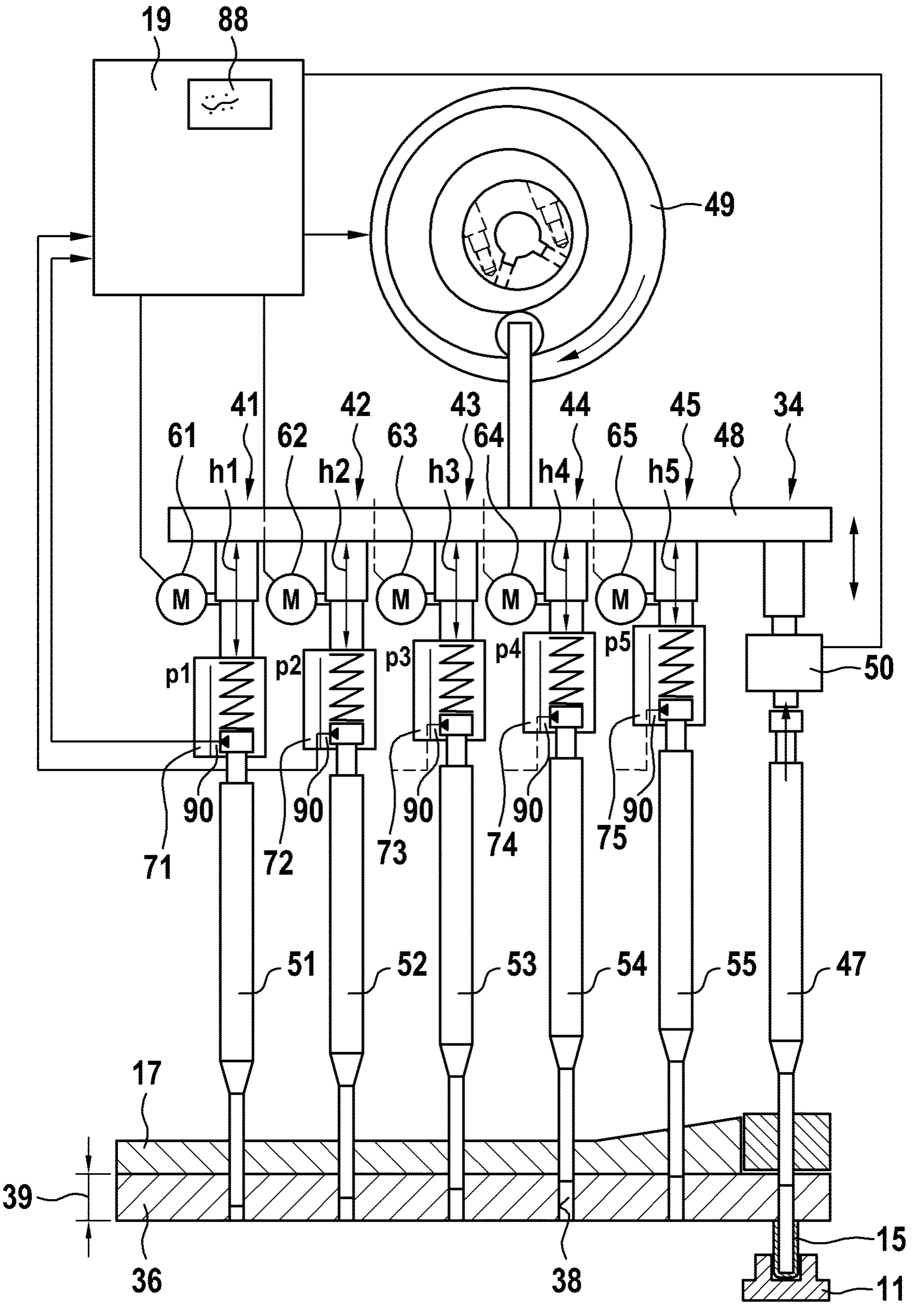
FIG. 2 is a side view of the dosing disc with associated tamping pins or transfer pins and adjusting drives for influencing the depth.

Filling station 25 is shown schematically in detail in FIG. 2. For each of the five filling stations 41-45 offered as an example, at least one tamping pin 51-55 is provided. The number of tamping pins 51-55 corresponds to the respective dosing openings 38 of the respective filling station 41-45. In the exemplary embodiment, ten tamping pins 51-55 are provided as an example per filling station 41-45. As can be seen in the section view, dosing disc 36 has dosing openings 38 having a depth 39. Dosing disc 36 could be designed such that the size of the dosing openings 38 may be adjusted via a variable depth 39.

The product 17 to be dosed into the dosing openings 38, such as powder, comes to rest on the dosing disc 36. Through a mechanism (not shown in detail), it enters the dosing openings 38 and is compressed there by appropriate tamping pins 51-55. More product 17 is dosed into each filling station 41-45. Corresponding to how the fill level of the product in dosing opening 38 increases, the depth h1 to h5 of the associated tamping pins 51-55 with which the tamping pins 51-55 plunge into the dosing openings 38 decreases. The undersides of the dosing openings 38 are closed at the filling stations 41-45. To transfer the dosed product 17 into the capsules 12 in transfer position 34, the underside of dosing opening 38 is exposed, so that the product 17 located in the dosing opening 38 can be pushed down into the respective lower part 15 of capsule 12 using at least one transfer pin 47. A force sensor 50 is arranged on transfer pin 47, by means of which the force acting during the transfer process can be detected. The output signal of force sensor 50 is fed to control device 19 for further evaluation. The transfer force should be within specific ranges if a correct transfer process can be assumed.

The tamping pins 51-55 each have associated adjusting drives 61-65, which can individually adjust the associated tamping pins 51-55 in their depth h1 to h5 or immersion depth. As a result, the tamping pins 51-55 each dip into the dosing openings 38 to different degrees. Alternatively, in addition to electromotive adjusting drives, other mechanical adjusting means or the like could also be provided via links as the adjusting means. It is essential that at least two tamping pins of different filling stations 41-45 can be adjusted in depth h1 to h5 independently of one another. However, at least one adjusting drive 61-65 is preferably provided for at least all the tamping pins 51-55 of a filling station 41-45 and can simultaneously adjust the depth h1 to h5 of these tamping pins 51-55 of a filling station 41-45.

In addition, each tamping pin 51-55 has a pressing means 71-75 which exerts a different force or pressure P1 to P5, for example in the form of a spring behavior, on the respective tamping pin 51-55. This pressing means 71-75 is individually adjustable. This could be, for example, a pneumatic spring for which the pressure on the tamping pins 51-55 may be individually influenced, for example by means of pneumatic cylinders. Pressing means 71-75 comprises at least one displacement sensor 90 for detecting the depths h1 to h5 or immersion depths. A displacement sensor 90 is preferably arranged on each pressing means 71-75. The output signals of the displacement sensors 90 are fed to control device 19.

If the spring or the pressing means 71-75 is an element in which the pressure p1 to p5 rises or falls depending on the spring travel, then conclusions can be drawn about the immersion depth or the degree of filling of dosing opening 38 according to the pressure p1 to p5. It is more expedient if the spring travel is measured directly via a displacement sensor 90.

Figure 3:
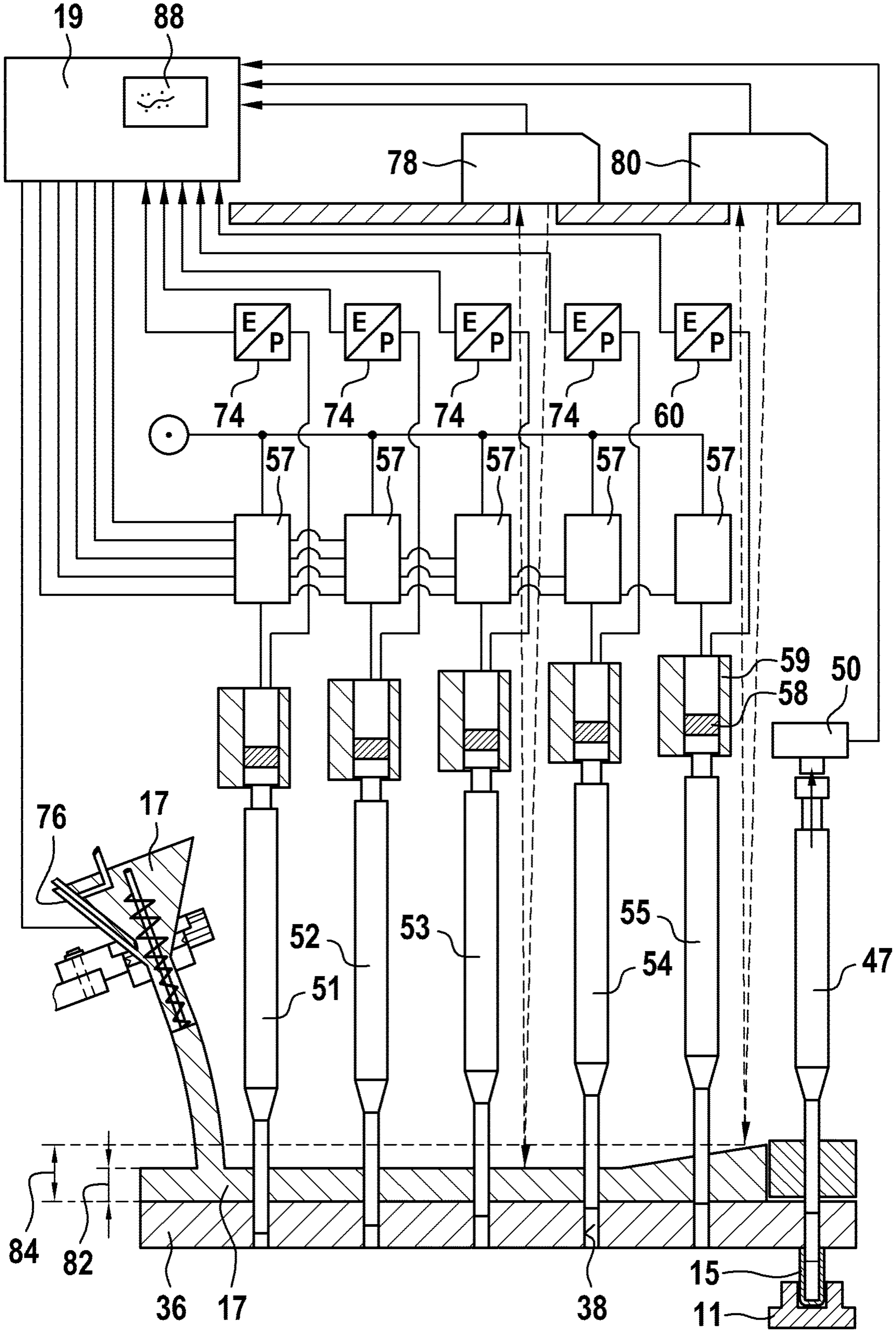
FIG. 3 is a side view of the dosing disc, in particular with a focus on the pressing means for changing the pressures with which the tamping pins plunge into the dosing openings.

The strength of the tamping force with which the individual tamping pins 51-55 deflect into the corresponding dosing openings 38, whether with a gentle or a strong reaction, may thus be set individually via the pressing means 71-75. A measure of this is the pressure p1 to p5 in the respective tamping springs or pressing means 71-75, which pressure is individually adjustable. As can be seen in FIG. 3, the pressing means 71-75 each have a pressure chamber 59 in which the piston 58 is movably mounted. Piston 58 is connected to the respective tamping pin 51-55. A pressure control element 57 is provided for each pressure chamber 59 that specifically influences the pressure p1 to p5 prevailing in the respective pressure chamber 59. The pressure p1 to p5 prevailing in the respective pressure chamber 59 is detected via corresponding transducers or sensors 74 and fed to control device 19. Control device 19 in turn controls the pressure control elements 57 such that the desired pressure p1 to p5 is set. Furthermore, FIG. 3 shows how the pressure control elements 57, such as a pressure control valve, are connected to a pressure source (not shown in detail), such as a compressed air source. Pressure control element 57, piston 58, pressure chamber 59 and transducers or sensors 74 can form the pressing means 71-75; if necessary, individual components such as sensors 74 may be omitted or arranged elsewhere.

Preferably, at least one pressing means 71-75 for the group of tamping pins 51-55 could be provided for each one filling station 41-45 via which the pressure p1 to p5 may be simultaneously adjusted for the tamping pins 51-55 of this filling station 41-45. Thus, for example, only one pressure chamber 59 could be provided for all pistons 58 of the tamping pins 51-55 of this filling station 41-45.

For example, it could also be springs as pressing means 71-75 having a constant pressure regardless of the spring travel. This has the advantage that the pressing force is always the same, regardless of the degree of filling of dosing opening 38.

A change in the pressure p1 to p5 could alternatively also be accomplished by changing the spring constants of mechanical springs.

The pressures p1 to p5 may be adjusted individually at least for different filling stations 41-45. Alternatively, however, it is also possible to group specific tamping pins 51-55 of specific filling stations in 41-45 into groups and to apply identical pressures p1 to p5 to these groups. For example, the first filling stations 41-43 could be supplied with a constant pre-pressure (p1 to p3), while the last two filling stations 44-45 could be supplied with a main pressure (p4 to p5). The main pressure can be larger than the pre-pressure. The setting and control process can be simplified by this grouping.

The respective tamping pins 51-55, adjusting drives 61-65 and pressing means 71-75 are mounted on a movable holder 48, the depth of which may be adjusted, in particular vertically, relative to the upper side of dosing disc 36 via an adjusting mechanism 49. Adjusting mechanism 49 may be, for example, a link via which the pins 51-55; 47 can plunge and lift out of or into the dosing openings 38. However, the extent to which the tamping pins 51-55 penetrate into the dosing openings 38 may be individually influenced, as described, via the adjusting drives 61-65. Adjusting mechanism 49 is the main drive for the tamping movement. Here, for example, a ball bearing is positively guided by a cam disc, and a linear stroke is generated from the rotary movement of a drive.

The above facts can be summarized as follows. The depth h1 to h5 of the associated tamping pins 51-55 is defined or set by the associated adjusting drives 61-65. The stroke or the plunged movement itself is produced by adjusting mechanism 49 as shown in FIG. 2. If there is now no product 17 in dosing opening 38, the tamping pin 51-55, moved by adjusting mechanism 49, travels without springing to the position (depth h1 to h5) which can be influenced by the adjusting means 61-65. If, on the other hand, product 17 is located in the dosing openings 38 and the counterforce of the product 17 located in the dosing openings 38 becomes large enough compared to the penetrating tamping pins 51-55 that the pressing means 71 deflect, the tamping pin 51-55 moves relative to the housing of the pressing means 71-75. This depth of the relative movement can be measured as well as the pressure increase when the pneumatic springs or pressing means 71-75 deflect. The displacement sensors 90 can be used to determine how far the tamping pins 51-55 have actually penetrated into dosing opening 38. Possibly, a lower penetration depth, in the form of the depth h1 to h5, can be achieved due to the pressing means 71 than originally specified by the adjusting drives 61-65.

In the illustration according to FIG. 3, at least one sensor 78, preferably yet another sensor 80, is provided which is arranged above dosing disc 36. The sensor or sensors 78, 80 detect the distance to the surface of the product 17 located on the dosing disc 36, preferably at different points. This can be achieved, for example, by evaluating, for example, the duration of a corresponding reflection of an emitted wave on the surface of product 17 or by other known technologies. For example, a laser sensor or an ultrasonic sensor is used. Alternatively, a capacitive sensor could be provided. However, the product bed depth can be detected more precisely and thus set more precisely using a laser sensor or ultrasonic sensor.

The one sensor 78 detects a product bed depth 82; the additional sensor 80 detects another product bed depth 84 at different radii of the dosing disc 36. Furthermore, a product feed 76 is provided which feeds dosing disk 36 further product 17 to be dosed. The product feed 76 may be accomplished, for example, via a dosing screw that is adjustable in rate, so that a specific product bed depth 82, 84 may be achieved in connection with the product feed 76. Dosing disc 36 rotates, for example, in a stop-and-go mode of operation, so that the product 17 is distributed and a specific product bed depth 82, 84 is set. A minimum depth is required to ensure the dosing of the product 17.

The following have emerged as process parameters which have a significant influence on the weight or the standard deviation of the weight of the dosed product 17: the depth h1-h5 (with which the tamping pins 51-55 plunge into the respective dosing openings 38), the pressure p1-p5 (with which the tamping pins 51-55 virtually deflect into the dosing openings 38, that is, the pressure p1-p5 which is applied via the pressing means 71-75 or springs to the product 17 which is located in the dosing opening 38), the product bed depth 82, 84, and the rotational speed 40 at which the dosing disc 36 is moved. The product feed 76 contributes to the desired setting of this process parameter by the desired setting of the product bed depth 82, 84.

The concept of automated startup enables, for example, a statistically optimized test plan to describe the relationships, in the form of a model 88, between the process parameters and the target magnitude, in particular the weight and/or the standard deviation of the weight of the dosed product 17. The tests are planned accordingly by control device 19. The corresponding settings of the process parameters are made accordingly, taking things out of and the testing room. On the one hand, this enables the model 88 of the process implemented in control device 19 to be formed. Different functions are available for this as a model basis (linear, interactions, quadratic, cubic, polynomial model . . . ). For example, in a quadratic model, the relationship could be as follows:

$$y1=a0+a1*x1+a2*x2+a11*x1^2+a22*x2\hat{}2+ \ldots +e$$

where weight: y1, rate or rotational speed 40: x1, powder bed depth 82, 84: x2, tamping pin depth h1-h5: x3, spring strength or pressure p1-p5: x4; and a0, a1, a2, a11, a22, e the corresponding model parameters of the model 88 to be determined.

This model 88 describes the relationships between the process parameters (preferably rate or rotational speed 40, powder bed depth 82, 84, tamping pin depth h1-h5, spring strength or pressure p1-p5) and the weight y1 of the filled product 17 (capsule weight). The process parameters to be set may thus be determined for a desired weight y1 or for a minimally required standard deviation.

After a possible model 88 has been selected, the model parameters a0, a1, a2, a11, a22, e are determined. Here, the control device 19 picks up the respective weight y1 for specific process parameters. The weight is particularly preferably recorded automatically. For this purpose there is a special weighing device 23, as shown by way of example in FIG. 1, which picks up the weight, for example, as part of the in-process control. Alternatively, the capsules 12 may also be bent by a separate unit or by sampling. An automatic recording of control device 19 with regard to the detected values of the weight simplifies the automatic evaluation.

The process parameters are varied within specific limits and the corresponding measurements of the weight y1 are carried out. Thus, at least one adjusting drive 61-65 changes at least one of the depths hl to h5, and/or at least one pressure p1 to p5 is changed, for example, via correspondingly changed pressure specifications of control device 19, and/or at least product bed depth 82, 84 is changed, and/or at least the rotational speed 40 of dosing disc 16 is changed. According to known model algorithms, the model parameters are determined on the basis of the various process parameter sets and associated measured values. For example, between 5, 10 and 20 series of tests may be carried out. All process parameters may also be varied simultaneously in different test series.

When all process parameters of the model 88 have been determined, the desired target weight is entered. The desired standard deviation or the scatter and the target weight may also be set. Based on the created model 88, specific settings for the process parameters are now determined for the specific target weight by control device 19.

The regulation may be performed out of the statistical model 88. In addition to the control, a new option for regulating the process has been developed. In practice, the determined model 88 therefore does not exactly match reality. It is also necessary to react to external influencing variables or disturbance variables that are not present in the model 88. This is achieved by a regulating intervention in the process. The model 88 can be used for automated startup. The model 88 makes it possible to determine which process parameter has the largest influence at this operating point and to what extent it has to be changed in order to compensate for the deviation. The model 88 specifies which process parameter has which influence and how the parameters, for example of a controller, are to be set in order to obtain the best possible process result. This model 88 originates from the automated startup process. The prerequisite for the automated startup process is the appropriate design of the device for influencing the process parameters in a targeted manner.

The process parameters can be influenced via a user interface, for example with regard to specific limits. The range of the process parameters in which the device is to vary these process parameters could also be specified.

The device carries out the tests automatically. For this purpose, a monitoring function is stored in control device 19 which uses the measurement of the transfer force determined by force sensor 50. This function interrupts the currently set test, for example when the forces are too high, and attempts to move the device freely (for example, via reduced process parameters, lower pressure p1-p5, lower depth h1-h5 of the tamping pins 51-55 or comparable measures. If this is not sufficient, the user is asked, for example, to intervene with cleaning or the like. The device or control device 19 independently decides when samples are to be taken: when the influence of the powder bed depth 82, 84 is examined, or else depending on the predetermined powder bed depth 82, 84, or else after a specific time (under specific circumstances selectable by the user) or a specific stability of the target size (average weight, average standard deviation). Sampling is performed automatically with the weighing station 23 or weighing device integrated in the process or with the aid of an external scale. The weight is automatically detected and supplied for the creation of the model 88. The data of the tests are fed to the polynomial model, for example, to create the corresponding parameters of the model 88. This modeling (regression) is carried out either automatically or with the assistance of the user. For example, the user could exclude specific tests that are then not used for the modeling. The determined data could also be transformed.

Once the model 88 has been created, the user can then have the influences of the process parameters and their interactions displayed. If the user is satisfied with the model 88, the model 88 can determine the process parameters. The process parameters determined in this way can be the basis for a new test for verification. Control device 19, in which the data acquisition and the creation of the model 88 can be located, could optionally be accessed by remote diagnosis.

The device for dosing a product is used in particular in packaging technology, in particular in capsule filling machines.

The invention claimed is:

1. A device for dosing a product in capsules, the device comprising at least one dosing disc which has dosing openings, and at least two filling stations with which groups of dosing openings are associated, wherein each filling station comprises at least one tamping pin; the tamping pin can plunge to a specified depth into the dosing opening to compress the product, and said tamping pin has at least one pressing means for producing a variable pressure with which each tamping pin elastically deflects into the dosing opening, characterized in that at least one adjusting means, in the form of an adjusting drive, is provided in order to adjust the depth for each of the tamping pins independently of one another, wherein at least one sensor is provided for detecting at least one product bed depth of the product arranged on the dosing disc and/or, in that at least one product feed is provided for feeding the product to the dosing disc in order to achieve a specific product bed depth.

2. The device according to claim 1, characterized in that at least one control device is provided for specifying different depths and/or different pressures and/or different product bed depths and/or different rotational speeds of at least one drive of the dosing disc as possible process parameters to be influenced.

3. The device according to claim 1, characterized in that at least one weighing device is provided for determining the weight of the product dosed into the capsules.

4. The device according to claim 2, characterized in that the control device for the different settings of the process parameters detects the respective weight of the product dosed into the capsule.

5. The device according claim 4, characterized in that the control device creates a model in which a relationship between at least one process parameter and the weight and/or the standard deviation of the dosed product is shown as a function of the different settings of the process parameters and the respective weight of the product dosed into the capsule.

6. The device according to claim 5, characterized in that the control device dependent on the model selects at least one setting of at least one process parameter as a function of a desired weight and/or a desired standard deviation of a desired weight of the dosed product.

7. The device according to claim 6, characterized in that the control device changes at least the depth and the pressure as process parameters to create the model.

8. The device according to claim 1, characterized in that at least one displacement sensor is provided for detecting at least one process parameter.

9. The device according to claim 1, characterized in that the pressing means comprises at least one pressure control element and/or at least one pressure chamber and/or at least one piston.

10. The device according to claim 2, characterized in that the control device controls at least the product feed to achieve a constant product bed depth.

11. The device according to claim 1, characterized in that at least one force sensor is provided on a transfer pin, wherein the transfer pin is provided for transferring the product located in a dosing opening into at least a lower part of the capsule.

* * * * *